(12) United States Patent
Kelly

(10) Patent No.: US 8,640,688 B2
(45) Date of Patent: Feb. 4, 2014

(54) HEAT COLLECTION ROOFING SYSTEM AND METHOD FOR COLLECTING HEAT WITHIN A ROOF

(76) Inventor: Thomas L. Kelly, Waterbury, CT (US)

( * ) Notice: Subject to any disclaimer, the term of this patent is extended or adjusted under 35 U.S.C. 154(b) by 593 days.

(21) Appl. No.: 12/840,572

(22) Filed: Jul. 21, 2010

(65) Prior Publication Data

US 2012/0018121 A1 Jan. 26, 2012

(51) Int. Cl.
| | |
|---|---|
| F24J 2/46 | (2006.01) |
| E04D 3/18 | (2006.01) |
| F24D 5/10 | (2006.01) |
| F24J 2/42 | (2006.01) |
| F24H 3/00 | (2006.01) |
| F28F 7/00 | (2006.01) |

(52) U.S. Cl.
USPC ........... 126/623; 126/621; 126/622; 126/624; 126/563; 126/566; 165/53; 165/47; 165/48.1; 165/48.2; 165/49; 165/81; 165/82; 165/83

(58) Field of Classification Search
USPC ......... 126/621, 622, 623, 563, 704, 432, 445, 126/448, 450, 566, 624, 4; 165/53, 47, 165/48.1, 48.2, 49, 83, 81, 82
See application file for complete search history.

(56) References Cited

U.S. PATENT DOCUMENTS

| | | | | | |
|---|---|---|---|---|---|
| 3,022,781 | A | * | 2/1962 | Andrassy | 126/624 |
| 3,946,720 | A | * | 3/1976 | Keyes et al. | 126/646 |
| 4,005,746 | A | * | 2/1977 | Young | 165/69 |
| 4,014,314 | A | * | 3/1977 | Newton | 126/626 |
| 4,059,095 | A | * | 11/1977 | Grundmann et al. | 126/624 |
| 4,098,260 | A | * | 7/1978 | Goettl | 126/583 |
| 4,151,830 | A | * | 5/1979 | Crombie et al. | 126/624 |
| 4,201,193 | A | * | 5/1980 | Ronc | 126/623 |
| 4,201,194 | A | * | 5/1980 | Charles | 126/633 |
| 4,257,481 | A | * | 3/1981 | Dobson | 165/168 |
| 4,287,876 | A | * | 9/1981 | Jacques | 126/624 |
| 4,296,798 | A | * | 10/1981 | Schramm | 165/56 |
| 4,404,960 | A | * | 9/1983 | Laing | 126/622 |
| 4,428,361 | A | * | 1/1984 | Straza | 126/668 |
| 4,510,920 | A | * | 4/1985 | Walmet | 126/561 |
| 4,574,876 | A | * | 3/1986 | Aid | 165/46 |
| 5,031,374 | A | * | 7/1991 | Batch et al. | 52/410 |
| 5,353,868 | A | * | 10/1994 | Abbott | 165/171 |
| 5,388,567 | A | * | 2/1995 | Hodak | 126/626 |
| 5,391,858 | A | * | 2/1995 | Tourangeau et al. | 219/213 |
| 6,739,097 | B1 | * | 5/2004 | Rodin | 52/71 |
| 2010/0147288 | A1 | * | 6/2010 | Stobbe | 126/621 |
| 2012/0061046 | A1 | * | 3/2012 | Goodrich et al. | 165/47 |

FOREIGN PATENT DOCUMENTS

| | | | | | |
|---|---|---|---|---|---|
| FR | 2456291 | A | * | 1/1981 | F24J 3/02 |
| GB | 190728130 | A | * | 0/1908 | |

* cited by examiner

*Primary Examiner* — Kenneth Rinehart
*Assistant Examiner* — William Corboy
(74) *Attorney, Agent, or Firm* — Cantor Colburn LLP

(57) ABSTRACT

Disclosed is a heat collection system for a roof, the system including a roof deck, a membrane upwardly adjacent of the roof deck; a fluid channel disposed between the membrane and the roof deck, the fluid channel having a defined entry port and a defined exit port, the entry port and the exit port being disposed in fluid communication via the fluid channel.

11 Claims, 5 Drawing Sheets

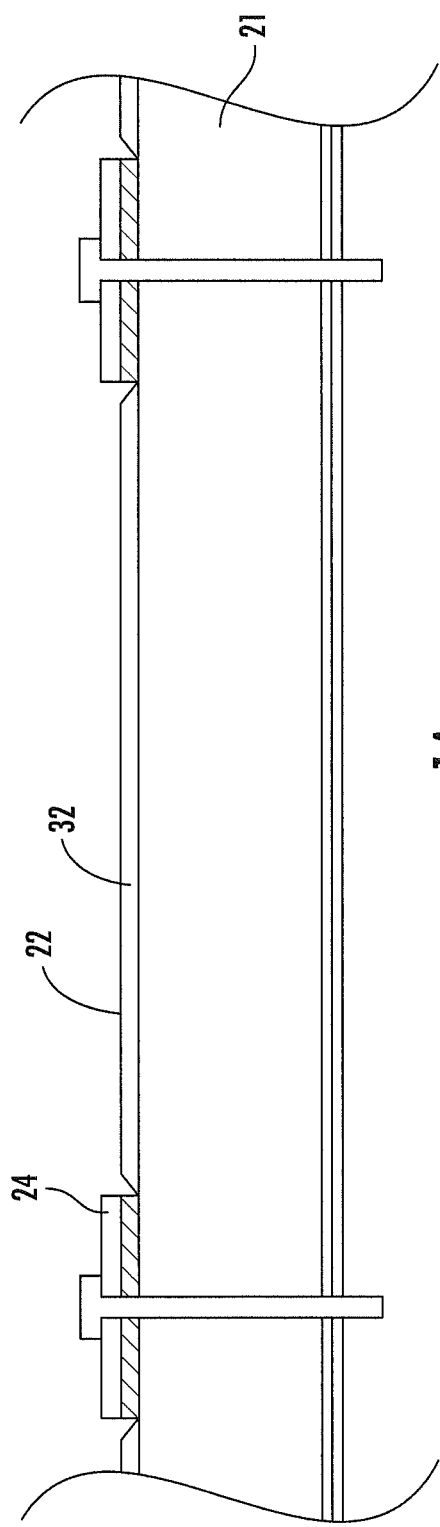

ically attached to the roof deck 14 via batten bars 24 and mechanical fasteners 26. As is shown in FIGS. 2-3, this mechanical fastening is made along the membrane 22 in desirable patterns. These patterns will be discussed in detail hereinbelow.

HEAT COLLECTION ROOFING SYSTEM AND METHOD FOR COLLECTING HEAT WITHIN A ROOF

FIELD

The disclosure is generally directed to a heat collection system, and more particularly directed to a heat collection system for a roof.

BACKGROUND

During daylight hours an upper exposed surface of a roof can heat up to temperatures well in excess of a temperature of the ambient air. Currently, this heat/energy goes unused by current roofing systems. With energy cost and demand being at a relative high, a roofing system that could harness this cleanly produced heat/energy would obviously be desirable.

SUMMARY

Disclosed is a heat collection system for a roof, the system including a roof deck, a membrane upwardly adjacent of the roof deck; a fluid channel disposed between the membrane and the roof deck, the fluid channel having a defined entry port and a defined exit port, the entry port and the exit port being disposed in fluid communication via the fluid channel.

Also disclosed is a method for collecting heat within a roofing system, the method including providing a roof deck; providing a membrane upwardly adjacent of the roof deck, providing a fluid channel disposed between the membrane and the roof deck, the fluid channel having a defined entry port and a defined exit port, the entry port and the exit port being disposed in fluid communication via the fluid channel, importing a fluid into the fluid channel via the entry port, moving the fluid from the entry port to the exit port, warming the fluid via solar ray collection by the membrane during the moving, and exporting the fluid from the exit port to a desired environment, the fluid being of a higher temperature at the exit port than the entry port.

BRIEF DESCRIPTION OF THE FIGURES

Referring now to the Figures, exemplary embodiments are illustrated, wherein the elements are numbered alike:

FIG. 1A is an enlarged schematic cross-sectional view of the heat collection system of FIG. 1;

DETAILED DESCRIPTION

Figure 1:
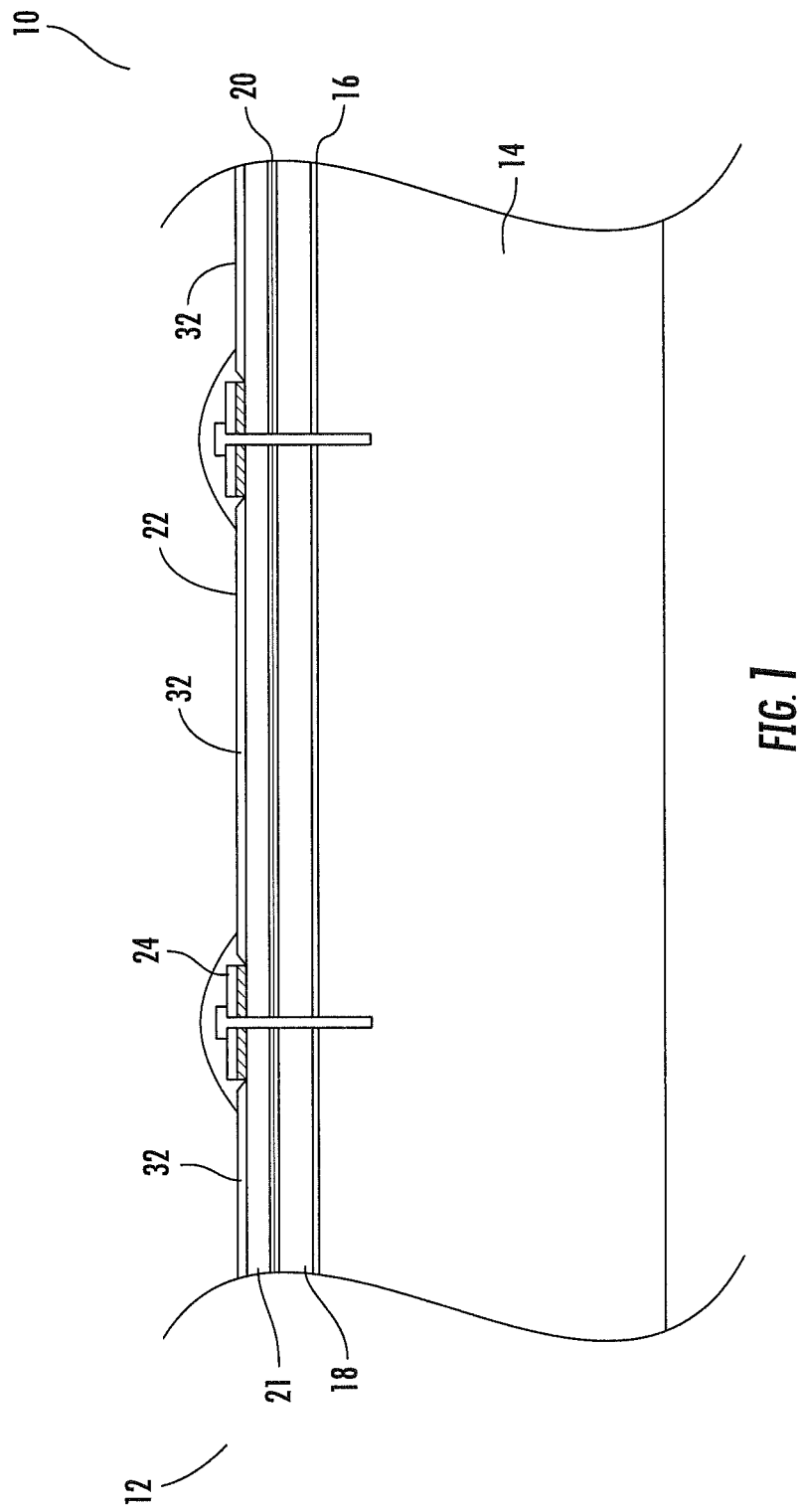
FIG. 1 is a schematic cross-section of a heat collection system in accordance with a first exemplary embodiment.

Referring to FIG. 1, a heat collection system 10 for a roof 12 is illustrated. This exemplary embodiment of the system 10 is layered to include a roof deck 14, an air barrier film or membrane 16, a rigid roof insulation board 18, a second air barrier film or membrane 20, a rigid cover board 21 (such as 0.25 inch gypsum), and a waterproofing membrane 22. Though the system 10 is shown to include the two barrier films/membranes 16 and 20, the insulation board 18, and the cover board 21 between the deck 14 and the membrane 22, it should be appreciated that this Application is not limited to the presence of such elements between the deck 14 and membrane 22. It should also be appreciated that the deck 14, and roof 12 in general, may include any desirable slope or grade.

Figure 2:
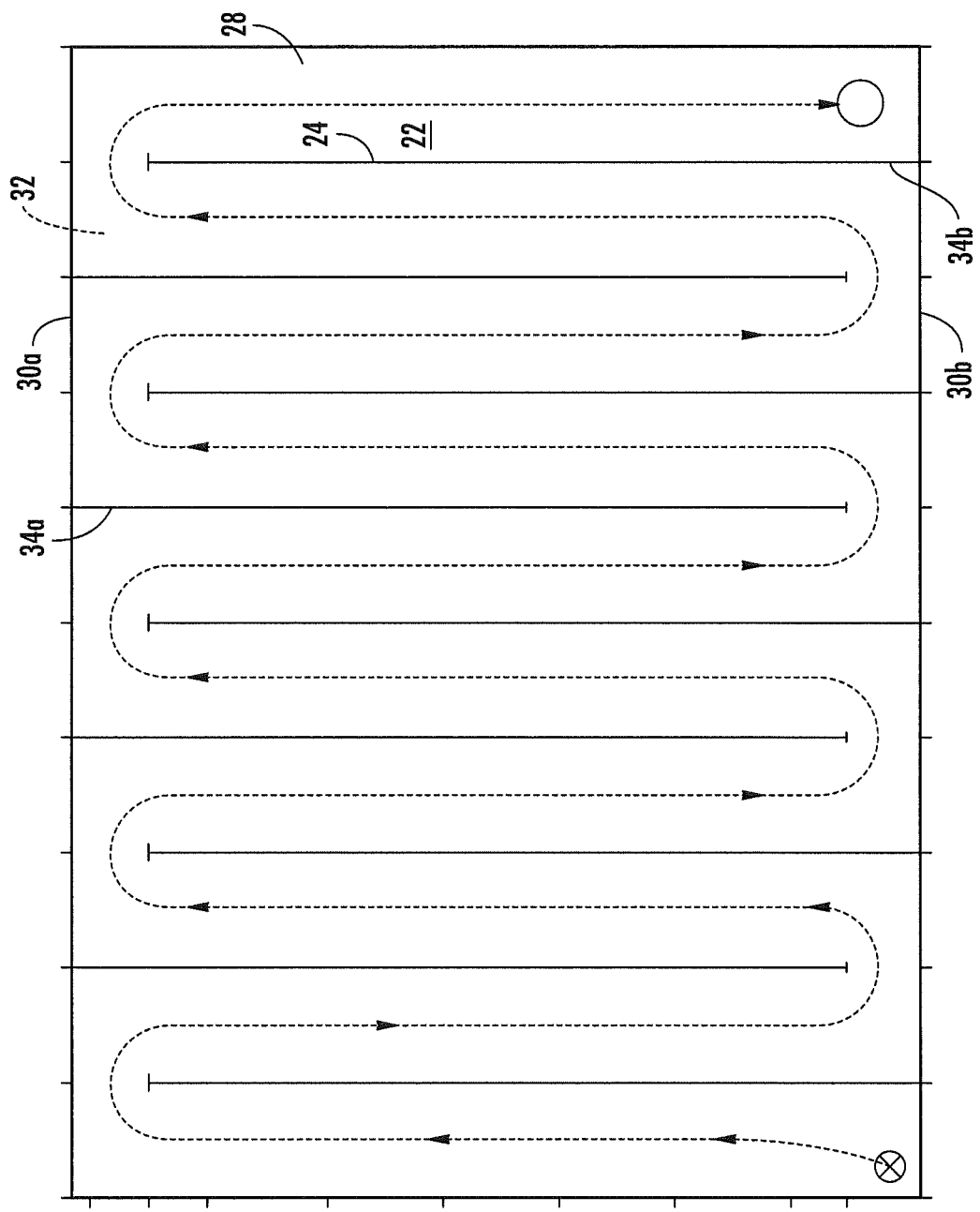
FIG. 2 is plan view of the heat collection system of FIG. 1.
Figure 3:
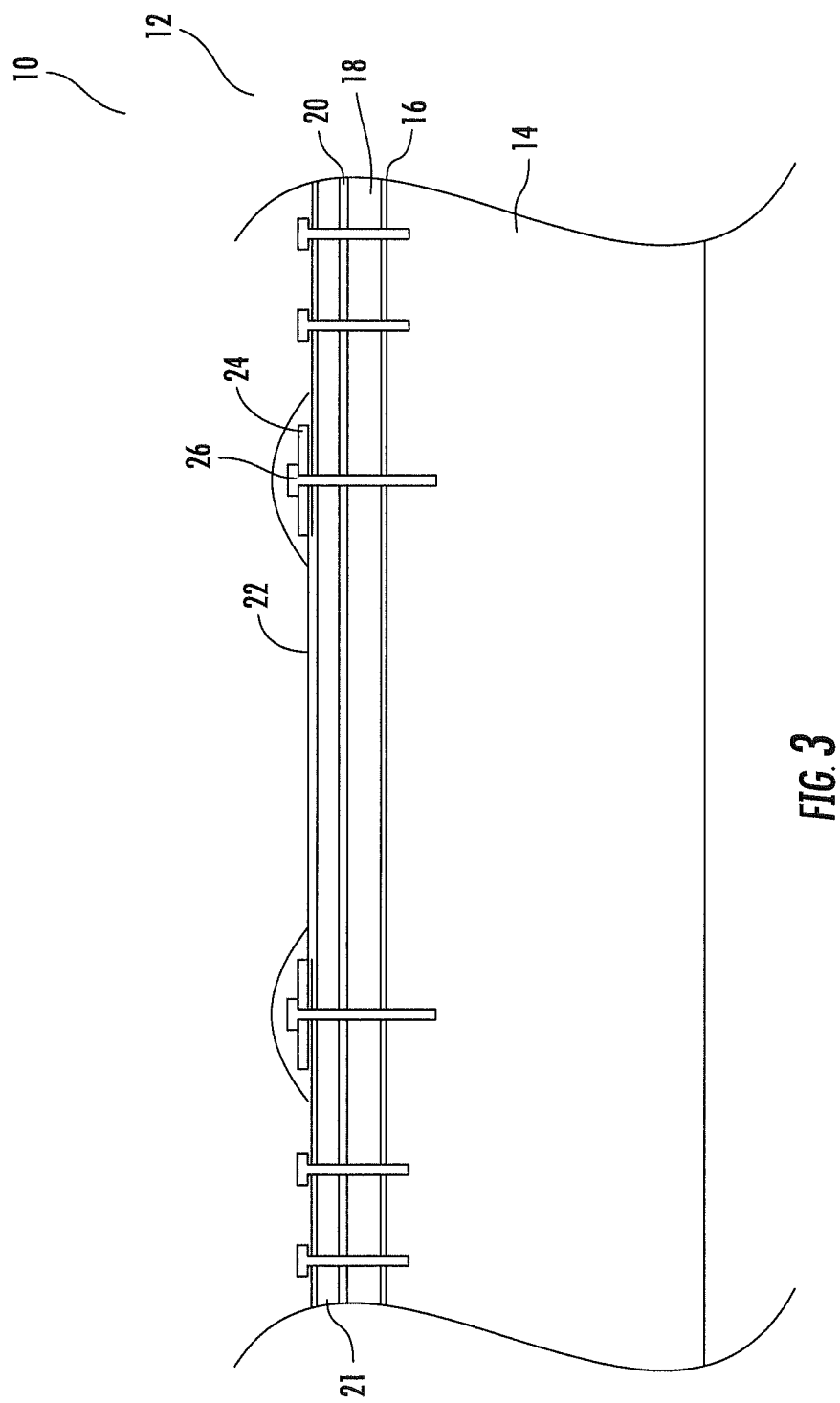
FIG. 3 is another schematic cross-section of the heat collection system of FIG. 1.

As shown in FIGS. 1 and 1A, the membrane 22, and the roofing components disposed between the membrane 22 and the roof deck 14, are mechanically attached to the roof deck 14 via batten bars 24 and mechanical fasteners 26. As is shown in FIGS. 2-3, this mechanical fastening is made along the membrane 22 in desirable patterns. These patterns will be discussed in detail hereinbelow.

Referring first to FIG. 2, the membrane 22 is shown to be fastened in a manner that creates a serpentine pattern 28. This pattern 28 is created by fastening the batten bars 24 to the membrane 22 in the alternating fashion shown in the figure. While these batten bars 24 obviously function to mechanically fasten the membrane 22 (and the rest of the roofing components) to the roof deck 14, the alternating manner in which the batten bars 24 extend from opposing sides 30a and 30b of the roof 12 further creates a fluid channel 32 under the membrane 22. By fastening the batten bars 24 such that they are alternatingly disposed to extend in rows 34a (extending from side 30a towards but not entirely to side 30b) and 34b (extending from side 30b towards but not entirely to side 30a), the channel 32 is created in a serpentine pattern 28 along the unfastened regions of the membrane 22. In the exemplary embodiment of FIGS. 1 and 1A, this channel 32 is shown to be delimited by a lower surface of the membrane 22 (at an upper extent of the channel 32) and an upper surface of the board 21 at a lower extent of the channel 32 (at an lower extent of the channel 32). The channel 32 is laterally delimited by the fastened batten bars 24 (as described above), as well as edges areas 34 of the roof 12 (where the membrane 22 is also fastened).

In order to facilitate the above discussed channels 32, the membrane 22 may be constructed of a material that is more flexible/resilient than at least the roofing component (such as the cover board 21) that delimits the lower extent of the channel 32. For example, the membrane may be constructed of material such as but not limited to EPDM, TPO, PVC, CPA, Hypalon, and modified bitumen. Such flexibility/resiliency in the membrane 22 would be beneficial to keeping the channel 32 open during a fluid flow therein.

In an exemplary embodiment, the above-discussed fluid flow is air flowing from an entry port 40 to an exit port 42. In the exemplary embodiment of FIG. 2, air is imported into the system 10 at entry port 40, and air is exported from the system 10 at exit port 42. In between import and export, the air travels in a serpentine pattern as is represented in FIG. 2 by airflow 44. While traveling along this pattern through the air channel 32, the air is warmed (at least during the day) by solar rays collected by the membrane 32. This warming takes place via convection, wherein the heated membrane (heated by the solar rays) transfers its heat to the air moving thereunder. In this manner, air that enters the system 10 at the entry port 40 will be at a higher temperature when it leaves the system at the exit port 42. The serpentine pattern 28 of the channel 32 increases a length of the airflow path, which increases surface area exposure of the air to warming membrane 22 as the air travels from the entry port 40 and exit port 42. A dark coloration at least an upper exposed surface of the membrane 22 increases solar ray collection by the membrane 22, which in turn allows for a more efficiently warmed fluid in the channel 32.

Referring again to the exemplary embodiment of FIG. 2, the entry port 40 and the exit port 42 are shown at substantially opposite ends 44a and 44b of the roof 12. In this embodiment, the entry port 40 is an opening (inclusive of any shape) at an end of the channel 32, which may, from any surface of the channel 32, be open to either an interior or exterior of the building upon which the roof 12 is disposed. The exit port 42 is an opening (inclusive of any shape) at an opposing end of the channel 32, which is very likely to open into an interior of the building upon which the roof 12 is disposed so that the warmed air may be used (though the air may be exported to any desirable area inside or outside the building). The exit port 42 may also open from any surface of the channel 32. In one exemplary embodiment (such as that shown in FIG. 3), the entry port 40 may be located along an edge of the roof 12, and open to an exterior of the building via an opening delimited at an upper extent by the membrane 22, and delimited at a lower extent by the roofing component that delimits the lower extent of the channel 32.

It should be appreciated that air may be imported and circulated through the system 10 via a variety of mechanisms and fluid actuation systems. For example, air may be imported into the channel 32 of the system 10 by dropping a pressure gradient at the exit port 42 relative to the entry port 40. Such a drop would create suction that would actively import air into the channel 32. This suction/drop in pressure gradient may be achieved via any desirable system of valves located at an area surrounding or within the exit port 42 or entry port 40. In addition, the warming of the air via convection may also inherently aid in importing fluid into the system channel 32. Any known fluid moving devices, such as but not limited to fans, blowers, and/or vacuums, may also be used to move fluid/air throughout the system 10. Of course, the entry port 40 and exit port 42 may be closeable so that air intake may be selectively chosen when desirable. Once the fluid/air is heated and expelled from the exit port 42, it may be used for any desirable purposed such as heating space inside or outside the building or drying articles of clothing.

Figure 4:
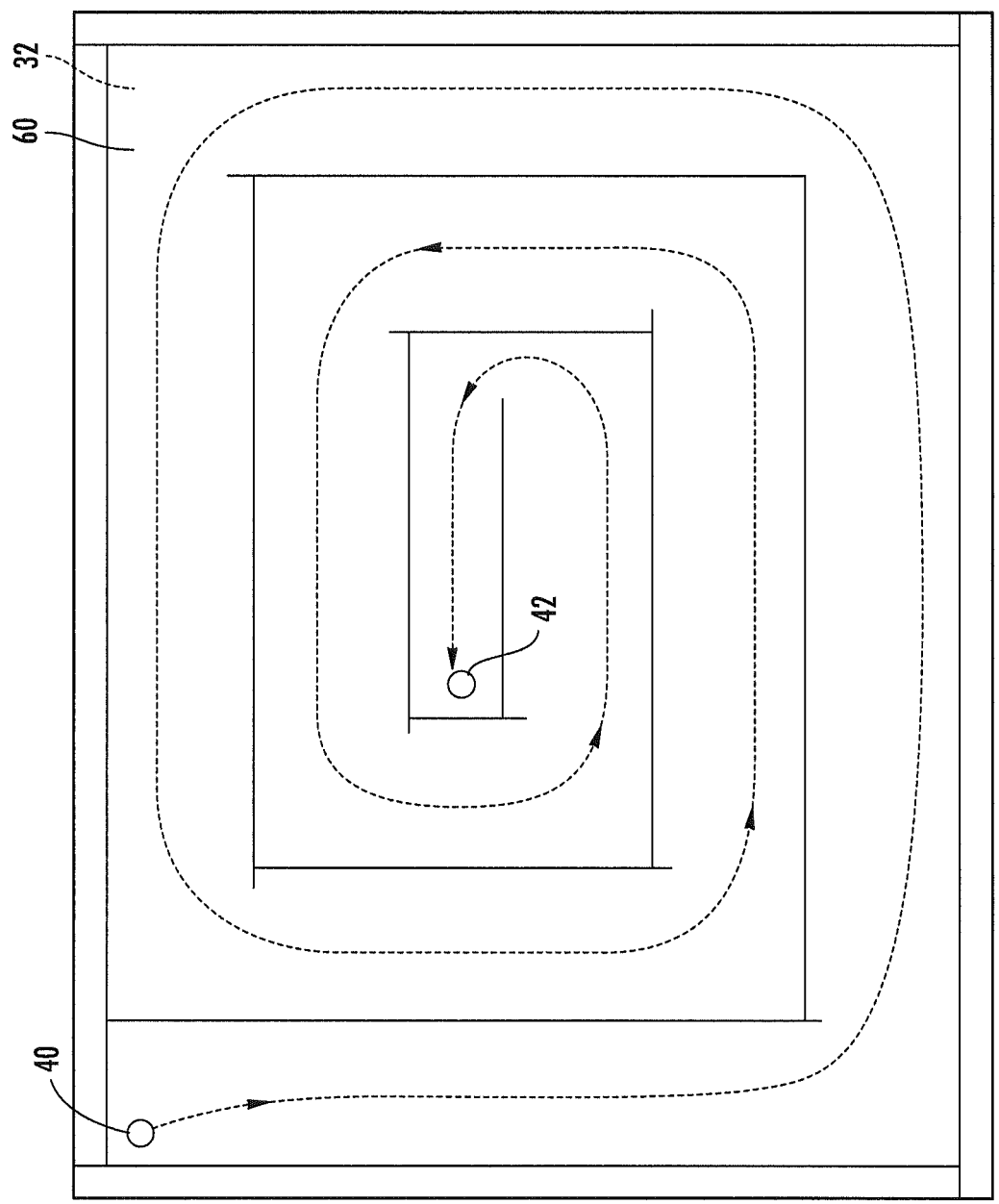
FIG. 4 is plan view of the heat collection system in another exemplary embodiment.

Referring now to FIG. 4, it should be appreciated that the channel 32 may be configured in any pattern that maximizes length of the channel 32 around and/or across the roof 12. Such a pattern may be the serpentine pattern discussed above, a coiled pattern 60 as shown in FIG. 4, or any other desirable maximizing pattern. This coiled pattern 60 (or any other desirable pattern) may be created in the system 10 via the mechanical fastening (i.e. batten fastening) discussed above. Obviously, the coiled pattern 60 of FIG. 4 necessitates disposal of the entry port 40 or exit port 42 at a relative center of the roof 12. In FIG. 4, the exit port 42 is disposed at this relatively central position.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A heat collection system for a roof, the system comprising:
   a roof deck;
   a waterproofing resilient membrane upwardly adjacent of said roof deck, wherein said membrane is a dark color; and
   a fluid channel disposed between said membrane and said roof deck, wherein said fluid channel is delimited at a relative upper extent via a relative under surface of said membrane, wherein said fluid channel is delimited at a relative lower extent via a relative upper surface of at least one of said roof deck or some other roofing component, wherein a serpentine or coiled flow pattern is created via a mechanical fastening of said membrane to said roof deck, said fluid channel having a defined entry port and a defined exit port, said entry port and said exit port being disposed in fluid communication via said fluid channel;
   wherein said fastening includes batten bars disposed atop said membrane and fastened to said roof deck, said batten bars being disposed in an alternating pattern to form said serpentine pattern such that one set of said bars extends from one roof edge of the roof, and a parallel set of said bars extends from an opposing roof edge of the roof, wherein each of said sets extending substantially but not entirely across the roof.

2. The system of claim 1, wherein said fluid channel includes a serpentine shape between said entry port and said exit port.

3. The system of claim 2, wherein said fluid channel is delimited at a relative upper extent via a relative under surface of said membrane, and wherein said fluid channel is delimited at a relative lower extent via a relative upper surface of a cover board disposed between said roof deck and said membrane, said cover board being of a more rigid construction than said membrane.

4. The system of claim 1, wherein said entry port and said exit port are disposed at opposite ends of the roof.

5. The system of claim 1, wherein said entry port is open to an interior or exterior of the building atop which the roof is disposed, and wherein said exit port opens into said interior of the said building.

6. The system of claim 1, wherein at least one of said entry port and said exit port is associated with a fluid actuation system configured to induce fluid flow into said entry port, across the fluid channel towards said exit port, and out of said exit port into an ambient environment surrounding said exit port.

7. The system of claim 1, wherein said entry port is an edge opening disposed at an edge of the roof, said edge opening being delimited at an upper extent by said membrane, and delimited at a lower extent by at least one of said deck or another roofing component disposed between said membrane and said deck, said edge opening being open to an ambient environment surrounding the roof.

8. A heat collection system for a roof, the system comprising:
   a roof deck;
   a waterproofing resilient membrane upwardly adjacent of said roof deck, wherein said membrane is a dark color; and
   a fluid channel disposed between said membrane and said roof deck, wherein said fluid channel is delimited at a relative upper extent via a relative under surface of said membrane, wherein said fluid channel is delimited at a relative lower extent via a relative upper surface of at least one of said roof deck or some other roofing component, wherein a serpentine or coiled flow pattern is created via a mechanical fastening of said membrane to said roof deck, said fluid channel having a defined entry port and a defined exit port, said entry port and said exit port being disposed in fluid communication via said fluid channel;

wherein said fluid channel includes a coiled shape created via said mechanical fastening of said membrane to said roof deck along said coiled pattern.

9. The system of claim 8, wherein said entry port is open to an interior or exterior of the building atop which the roof is disposed, and wherein said exit port opens into said interior of the said building.

10. The system of claim 8, wherein at least one of said entry port and said exit port is associated with a fluid actuation system configured to induce fluid flow into said entry port, across the fluid channel towards said exit port, and out of said exit port into an ambient environment surrounding said exit port.

11. The system of claim 8, wherein said entry port is an edge opening disposed at an edge of the roof, said edge opening being delimited at an upper extent by said membrane, and delimited at a lower extent by at least one of said deck or another roofing component disposed between said membrane and said deck, said edge opening being open to an ambient environment surrounding the roof.

* * * * *